United States Patent
Carney Landow

(10) Patent No.: US 10,771,523 B1
(45) Date of Patent: Sep. 8, 2020

(54) ASYNCHRONOUS REAL-TIME MEDIA TRANSFER OVER WIRELESS NETWORKS

(71) Applicant: DISH Network L.L.C., Englewood, CO (US)

(72) Inventor: Kate Megan Carney Landow, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/383,300

(22) Filed: Apr. 12, 2019

(51) Int. Cl.
| | |
|---|---|
| *H04L 29/06* | (2006.01) |
| *H04W 76/10* | (2018.01) |
| *H04W 76/25* | (2018.01) |
| *H04W 12/04* | (2009.01) |
| *H04W 88/02* | (2009.01) |
| *H04W 80/04* | (2009.01) |
| *H04W 80/06* | (2009.01) |

(52) U.S. Cl.
CPC ........ *H04L 65/4084* (2013.01); *H04L 63/166* (2013.01); *H04L 65/1069* (2013.01); *H04W 12/04031* (2019.01); *H04W 76/10* (2018.02); *H04W 76/25* (2018.02); *H04W 80/04* (2013.01); *H04W 80/06* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2009/0193126 A1* | 7/2009 | Agarwal | H04L 29/08846 709/228 |
| 2013/0326024 A1* | 12/2013 | Chen | H04L 65/4084 709/219 |
| 2017/0295503 A1* | 10/2017 | Govindaraju | H04W 4/38 |
| 2018/0295134 A1* | 10/2018 | Gupta | H04L 63/166 |

* cited by examiner

*Primary Examiner* — Davoud A Zand

(57) ABSTRACT

Methods, systems, media devices, and non-transitory, machine-readable media to facilitate asynchronous wireless media transfer are disclosed. A request for video service from a content provider system via a wireless network may be received. A media device may be configured to provide an asynchronous session for subsequent video content transfer. The configuring may utilize a network layer and a transport layer without utilizing a presentation layer and an application layer. Specifications of asynchronous session parameters may be created to define delivery operations with the asynchronous session. An encrypted token, corresponding to the specifications, may be created. Opening of the asynchronous session may be requested by transmitting the encrypted token to the content provider system from the transport layer. At the session layer, the asynchronous session may be started for video content delivery in accordance with the specifications of the asynchronous session parameters. Display of the video content may be caused.

20 Claims, 7 Drawing Sheets

ASYNCHRONOUS REAL-TIME MEDIA TRANSFER OVER WIRELESS NETWORKS

This disclosure generally relates to content delivery, and more particularly to asynchronous real-time media transfer over wireless networks.

BACKGROUND

The evolution of wireless networks may present a number of challenges and problems for video delivery along with delivery of other types of data within the same bandwidth. The proliferation of different content and uses of wireless networks presents a number of difficulties. Chief among the challenges and problems for video delivery with next-generation wireless networks is how to deliver video with more speed, efficiency, and quality, along with other increasing network traffic. Additionally, the transition to next-generation wireless networks presents challenges when conventional telecommunications equipment currently available may not yet be suitable for the next-generation wireless networks, which may include quantum physics and quantum computing technologies.

Thus, there is a need for systems and methods that address the foregoing problems. This and other needs are addressed by the present disclosure.

BRIEF SUMMARY

Certain embodiments of the present disclosure relate generally to content delivery, and more particularly to asynchronous real-time media transfer over wireless networks.

In some aspects, a method for asynchronous wireless media transfer is disclosed. The method may include one or a combination of the following. An electronic communication may be received by a media device from a user interface. The electronic communication may correspond to a request for video service from a content provider system that is communicably couplable with the media device via a wireless network. Consequent to the electronic communication, the media device may self-configure to provide an asynchronous session within which video content is subsequently transferred from the content provider system to the media device via the network. The configuring the media device by the media device may include utilizing a network layer and a transport layer of the media device to execute operations of a configuration session. The operations of the configuration session may be executed without utilizing a presentation layer and an application layer of the media device. The configuration session may include creating specifications of asynchronous session parameters to define delivery operations for subsequent delivery of the video content with the asynchronous session. An encrypted token may be stored in storage of the media device, the encrypted token corresponding to the specifications of the asynchronous session parameters. Subsequent to the configuring the media device, the media device may request opening of the asynchronous session at least in part by transmitting the encrypted token to the content provider system via the network from the transport layer of the media device. At the session layer of the media device, the asynchronous session may be started, within which asynchronous session video packets corresponding to the video content may be delivered from the content provider system to the media device in accordance with the specifications of the asynchronous session parameters. Display of at least part of the video content may be caused by the media device.

Further, in some aspects, a system to facilitate asynchronous wireless media transfer is disclosed. The system may include a media device to facilitate asynchronous wireless media transfer. The media device may include one or a combination of the following. Memory may be communicatively coupled with and readable by one or more processors and having stored therein processor-readable instructions which, when executed by the one or more processors, cause the one or more processors to perform one or a combination of the following. An electronic communication received from a user interface may be processed. The electronic communication may correspond to a request for video service from a content provider system that is communicably couplable with the media device via a wireless network. Consequent to the electronic communication, the media device may be configured to provide an asynchronous session within which video content is subsequently transferred from the content provider system to the media device via the network. The configuring the media device may include utilizing a network layer and a transport layer of the media device to execute operations of a configuration session. The operations of the configuration session may be executed without utilizing a presentation layer and an application layer of the media device. The configuration session may include creating specifications of asynchronous session parameters to define delivery operations for subsequent delivery of the video content with the asynchronous session. An encrypted token may be stored in storage of the media device, the encrypted token corresponding to the specifications of the asynchronous session parameters. Subsequent to the configuring the media device, the media device may request opening of the asynchronous session at least in part by transmitting the encrypted token to the content provider system via the network from the transport layer of the media device. At the session layer of the media device, the asynchronous session may be started, within which asynchronous session video packets corresponding to the video content may be delivered from the content provider system to the media device in accordance with the specifications of the asynchronous session parameters. Display of at least part of the video content may be caused.

Still further, in some aspects, one or more non-transitory, machine-readable media having machine-readable instructions thereon which, when executed by one or more processing devices, cause the one or more processing devices to perform one or a combination of the following. An electronic communication received from a user interface may be processed. The electronic communication may correspond to a request for video service from a content provider system that is communicably couplable with a media device via a wireless network. Consequent to the electronic communication, the media device may be configured to provide an asynchronous session within which video content is subsequently transferred from the content provider system to the media device via the network. The configuring the media device by the media device may include utilizing a network layer and a transport layer of the media device to execute operations of a configuration session. The operations of the configuration session may be executed without utilizing a presentation layer and an application layer of the media device. The configuration session may include creating specifications of asynchronous session parameters to define delivery operations for subsequent delivery of the video content with the asynchronous session. An encrypted token may be stored in storage of the media device, the encrypted token corresponding to the specifications of the asynchronous session parameters. Subsequent to the configuring the media device, the media device may request opening of the asynchronous session at least in part by transmitting the encrypted token to the content provider system via the network from the transport layer of the media device. At the session layer of the media device, the asynchronous session may be started, within which asynchronous session video packets corresponding to the video content may be delivered from the content provider system to the media device in accordance with the specifications of the asynchronous session parameters. Display of at least part of the video content may be caused.

Various embodiments of the above aspects may include one or a combination of the following. A session within the session layer of the media device may not be opened until the starting of the asynchronous session. The configuring the media device to provide the asynchronous session may also configure the media device for a plurality of asynchronous sessions within which the video content and/or additional video content are subsequently transferred from the content provider system to the media device via the network in accordance with the specifications of the asynchronous session parameters. Each session of the plurality of the asynchronous sessions may be based at least in part on a respective subsequent transmission of the encrypted token to the content provider system via the network from the transport layer of the media device. The configuration session may further include defining one or more relationship specifications to govern the video service, and the specifications of the asynchronous session parameters comprise the one or more relationship specifications. The configuration session may further include specifying an encryption protocol for encryption of communications for subsequent transfer of the video content from the content provider system, and the specifications of the asynchronous session parameters comprise specifications of the encryption protocol. The configuration session may further include specifying keep-alive parameters corresponding to rules for delivery of the video content, and the specifications of the asynchronous session parameters may include the keep-alive parameters. The encrypted token may be created by the content provider system and received by the media device, or may be created by the media device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
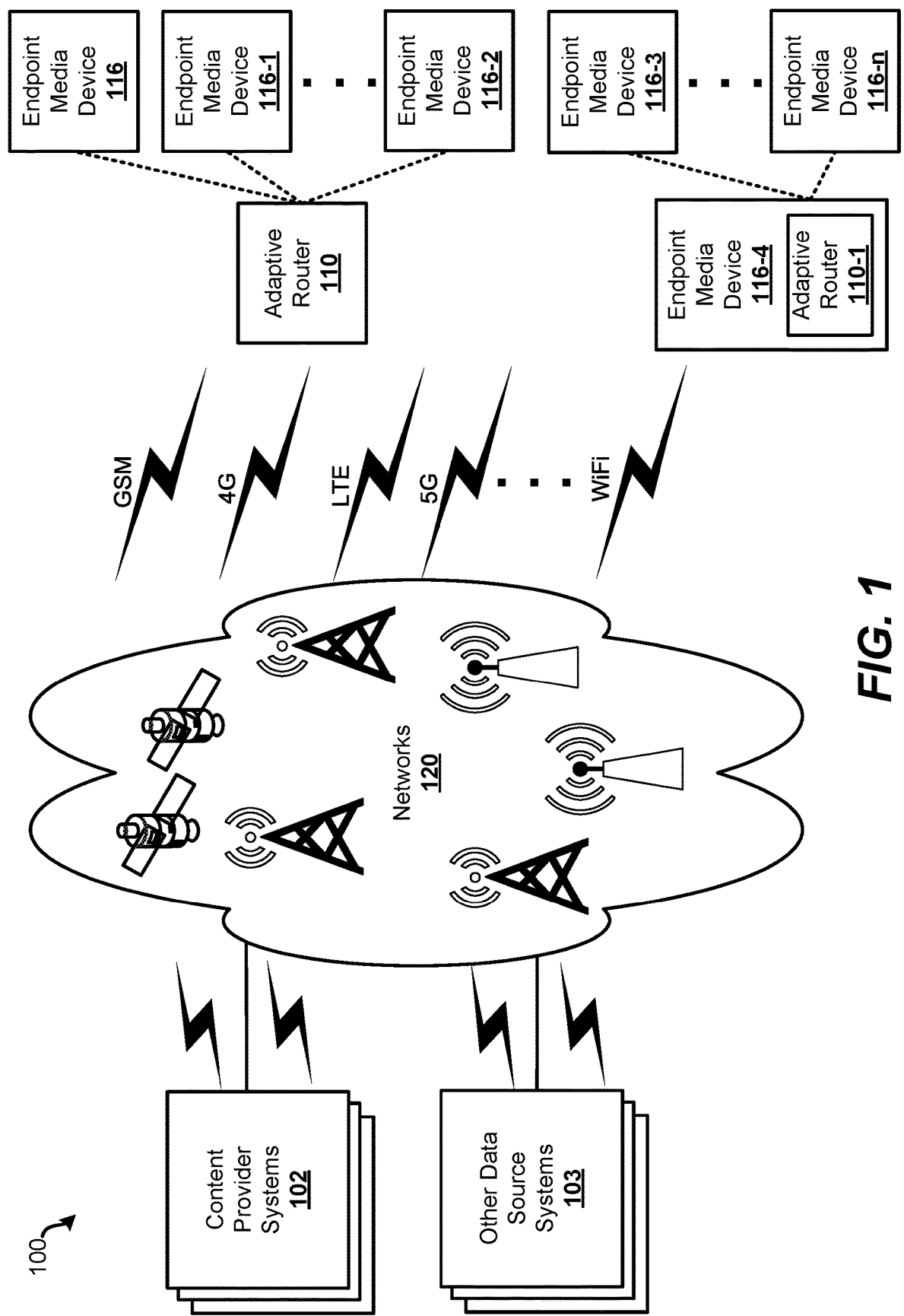
FIG. 1 illustrates a content distribution system, in accordance with disclosed embodiments of the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The evolution to 5G wireless networks and beyond may present a number of challenges and problems for video delivery along with delivery of other types of data within the same bandwidth. Chief among the challenges and problems for video delivery with next-generation wireless networks is how to deliver video with more speed and efficiency, along with other increasing network traffic. A multiplicity of traffic, for example, may involve video transport per the ATSC (Advanced Television Systems Committee) 3.0 standard or a like protocol, along with transmissions per the NBIOT (Narrow Band Internet of Things) standard or the like, VOIP (Voice over Internet Protocol) or the like, as well as email, HTTP (Hyper Text Transfer Protocol) content, etc. Such traffic may use the same bandwidth, which causes inefficiencies and deficiencies in video transport. Among the problems with telecommunications delivery of video is latency, particularly when ack-back processes are involved (e.g., with TCP (Transport Control Protocol) delivery), which adds latency. Although the converse approach may not involve ack-back processes to the same extent (e.g., with UDP (User Datagram Protocol) delivery), insufficient and unsatisfactory quality of video may result. Yet another problem may be that file-based delivery, not covered with conventional video carriage methods, may still be desirable by some. Still another problem may be the transition to 5G wireless when conventional telecommunications equipment currently available may not yet be suitable for a 5G network and beyond.

Disclosed embodiments may solve such problems and may provide for solutions that are not only suitable for a next-generation network (e.g., 5G wireless network and beyond), but also allow for conventional technology (e.g., 4G technology) to optimally transition to use within a next-generation wireless network. Disclosed embodiments may facilitate the ability to mix multiple different types of signals within the same bandwidth with more efficiency in identifying types of traffic (e.g., video, voice, etc.) of a next-generation network and routing the traffic according to the types of connections/transport determined, while providing particular advantages with video transport in the deployment of next-generation networks. Rather than identifying types of and routing the traffic at the session layer, disclosed embodiments may employ a new type of connection and rules at the transport layer, lower down on the networking chain to obviate the need for deeper packet inspections and opening and inspecting sessions.

Various embodiments may use a Swiss cheese model where a particular spectrum may be utilized to provide high-quality video transport with more efficiency (e.g., more than TCP) with more resiliency (e.g., more than UDP), simultaneously with the other traffic. Video traffic may be more easily and efficiently separated from other traffic with the disclosed embodiments. With digital television, the video data may not only be converted to zeros and ones, but also converted to an OSI (Open Systems Interconnection) model with disclosed embodiments, which is much more in line with how data is transferred over IP (Internet Protocol) networks. Disclosed embodiments may optimize the interchange of network, transport, and session layers to optimize judicious carriage of video with richer network technology. Further, disclosed embodiments may efficiently and optimally facilitate local content for particular geo-locations (e.g., micro-television station content) without interfering with over-the-air content. Still further, disclosed embodiments may provide for asynchronous authenticated and encrypted video transport and transactions across multiple sessions while creating a single application experience. These and other advantages are provided by embodiments of the present disclosure.

Various embodiments will now be discussed in greater detail with reference to the accompanying figures, beginning with FIG. 1. FIG. 1 illustrates a content distribution system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or another type of media or content distribution system.

In general, the system 100 may include a plurality of networks 120 that can be used for bi-directional communication paths for data transfer between components of system 100. Providing particular advantages, disclosed embodiments may transmit and receive data, including video content, via the networks 120 using an asynchronous control protocol (ACP) disclosed further herein. As referenced herein, video and video content may include just video content and/or audio content and video content (i.e., audio-visual content). The networks 120 may be or include one or more next-generation networks (e.g., 5G wireless networks and beyond). Further, the plurality of networks 120 may correspond to a hybrid network architecture with any number of terrestrial and/or non-terrestrial networks and/or network features, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. In various instances, the networks 120 may be implemented with, without limitation, satellite communication with a plurality of orbiting (e.g., geosynchronous) satellites, a variety of wireless network technologies such as 5G, 4G, LTE (Long-Term Evolution), 3G, GSM (Global System for Mobile Communications), another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or message in accordance with embodiments disclosed herein. In various embodiments, the networks 120 and its various components may be implemented using hardware, software, and communications media such wires, optical fibers, microwaves, radio waves, and other electromagnetic and/or optical carriers; and/or any combination of the foregoing and/or the like. In some embodiments, the networks 120 may include a telephone network that may be circuit switched, package switched, or partially circuit switched and partially package switched. For example, the telephone network may partially use the Internet to carry phone calls (e.g., through VoIP). In various instances, the networks 120 may transmit data using any suitable communication protocol(s), such as TCP/IP (Transmission Control Protocol/Internet protocol), SNA (systems network architecture), IPX (Internet packet exchange), UDP, AppleTalk, and/or the like.

The system 100 may include one or more content provider systems 102, one or more other data source systems 103, and media devices including adaptive routers 110 and various endpoint devices 116. Many embodiments may include a large number of content provider systems 102, data source systems 103, and/or such media devices. The one or more content provider systems 102 may include one or more television service provider systems. The content provider systems 102 may distribute broadcast video content to the endpoint devices 116 via one or more networks of the networks 120 and the adaptive routers 110. For example, a content provider system 102 may be configured to stream, via the networks 120, television channels, on-demand programming, movies, other shows, television programs or portions of television programs following and/or during a live broadcast of the television programs, advertising content and commercials, programming information (e.g., table data, electronic programming guide (EPG) content, etc.), and/or other services to endpoint devices 116 via satellite, 5G, 4G, and/or LTE wireless communication protocols and network components, in accordance with embodiments disclosed herein.

A content provider system 102 with satellite transmitter equipment, satellite uplink, and/or other network routing equipment that may, for example, be operated by a television service provider. The content provider system 102 may receive feeds of one or more television channels from various sources. Such television channels may include multiple television channels that contain the same content (but may be in different formats, such as high-definition and standard-definition). To distribute such video content to endpoint devices 116, feeds of the video content may be relayed to the adaptive routers 110 and the endpoint devices 116 via one or more satellites in the form of transponder streams or transmitted to the adaptive routers 110 and the endpoint devices 116 via ACP disclosed herein and specifically designed for transmission via a 5G wireless network, for example.

The data source systems 103 may correspond to any suitable sources of data such as one or more computer systems, databases, websites, portals, any repositories of data in any suitable form, server systems, other endpoint devices like endpoint devices 116 but functioning as data sources, and/or the like. In some instances, the data source systems 103 may include one or more mobile computing device locator services that provide information regarding the location of one or more of the endpoint devices 116 and/or the the adaptive routers 110. In various instances, the data source systems 103 may provide various details relating to IP addresses, cellular tower identification and location data, mobile device triangulation data, LAN identification data, Wi-Fi identification data, access point identification and location data, and/or the like data that facilitates location of one or more of the endpoint devices 116 and/or the adaptive routers 110.

In various embodiments, the data (e.g., location data indicating locations of endpoint devices 116 and/or the adaptive routers 110) from one or more of the data source systems 103 may be retrieved and/or received by a television service provider system 102 via one or more data acquisition interfaces through network(s) 120 and/or through any other suitable means of transferring data. In various embodiments, the television service provider system 102 the data source systems 103 could use any suitable means for direct communication. In various embodiments, the television service provider system 102 may actively gather and/or pull from one or more of the data source systems 103. Additionally or alternatively, the television service provider system 102 may wait for updates from one or more of the data source systems 103. The data collected (location data, IP address, etc.) may be curated so that only the data necessary for the transaction is collected. In some applications, as the ACP protocol operates at a lower layer, it may benefit the end user's privacy and overall system security as less data is passed up and down the OSI stack compared to conventional methods. The one or more data acquisition interfaces may include one or more application programming interfaces (APIs) that define protocols and routines for interfacing with the data source systems 103. The APIs may specify application programming interface (API) calls to/from data source systems 103. In some embodiments, the APIs may include a plug-in to integrate with an application of a data source systems 103. The data acquisition interfaces, in some embodiments, could use a number of API translation profiles configured to allow interface with the one or more additional applications of the data sources to access data (e.g., a database or other data store) of the data source systems 103. The API translation profiles may translate the protocols and routines of the data source systems 103 to integrate at least temporarily with the system and allow communication with the system by way of API calls.

Figure 2:
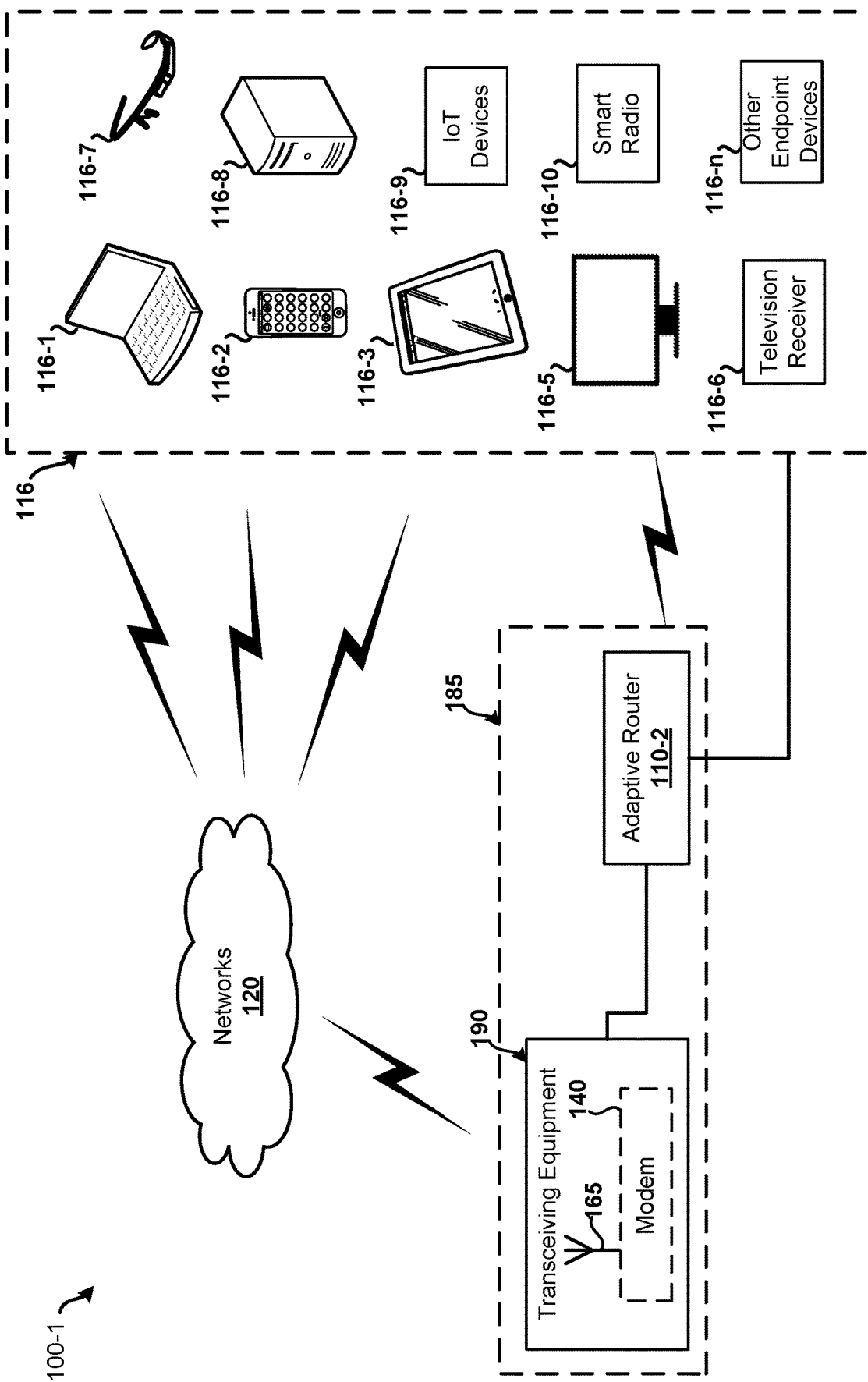
FIG. 2 illustrates certain aspects of an endpoint side of the content distribution system, in accordance with disclosed embodiments of the present disclosure.

FIG. 2 illustrates certain aspects of an endpoint side 100-1 of the content distribution system 100, in accordance with embodiments of the present disclosure. Media devices receiving transmissions from the networks 120 may include the endpoint devices 116 and the adaptive routers 110. The media devices may correspond to various computerized devices that may be configured to receive a multiplicity of transmissions via next-generation wireless networks such as video per the ATSC 3.0 standard or a like protocol, transmissions per the NBIOT standard or the like, VOIP or the like, as well as email, HTTP content, etc. The transmissions may transport any one or combination of raw data, unstructured data, structured data, information, metadata, and/or content which may include media content, text, documents, files, instructions, code, executable files, images, video (including audiovisual), audio, and/or any other suitable content suitable for embodiments of the present disclosure. When the endpoint devices 116 receive content (e.g., video content) streamed or otherwise transmitted from servers of a service provider system 102, the content may be processed, stored, executed, and/or displayed by the endpoint devices 116 using one or more applications installed on the endpoint devices 116 in accordance with ACP disclosed further herein. As illustrated, the endpoint devices 116 may, by way of example, include smartphones, tablet computers, television receivers, smart glasses or other similar forms of wearable computing devices, laptop computers, desktop computers, home servers, smart speakers, display devices, smart radios, gaming consoles, vehicle computers, and/or one or more other I/O devices to facilitate local user interfaces configured to implement communications protocols disclosed herein.

Various instances of endpoint environments at various localities may include one or a combination of the various types of endpoint devices 116. Some instances of endpoint environments may include a transceiving subsystem 185, which may include the adaptive router 110 and transceiving equipment 190, such as a connected modem 112 and one or more antennas 114. Some instances of endpoint environments may not include the transceiving subsystem 185, but only one or more endpoint devices 116 configured to provide the functionality of the transceiving subsystem 185 in whole or in part.

As illustrated in FIGS. 1 and 2, in some embodiments, the adaptive router 110 may be a separate media device that is distinct from, and communicating with, one or more endpoint devices 116 within range of the adaptive router 110. The adaptive router 110 may facilitate communication of the one or more endpoint devices 116 via the networks 120, and may also facilitate communication of multiple endpoint devices 116 with each other by forming, for example, a LAN, a WAN, a HAN, a WLAN, and/or the like at various localities. In various embodiments, the adaptive router 110 can be in communication with one or more of the endpoint devices 116 using wired or wireless communications links. In some embodiments, the adaptive router 110 may additionally facilitate the endpoint devices 116 sending and/or receiving data to/from the data networks 120 via a separate, connected modem 112 and one or more antennas 114. In other embodiments, the adaptive router 110 may include the one or more antennas 114 and/or include the modem 112 in whole or in part or otherwise be configured to provide the functionality of a modem in whole or in part.

Each adaptive router 110 may include a Layer 3 network gateway device. The adaptive router 110 may provide a bridge from one or more endpoint devices 116 to a 5G wireless network of the networks 120. The adaptive router 110 may include any suitable routers, switches, modems, wireless transceivers, wired ports, etc., one or more processors, and input-output (I/O) interfaces, and one or more types of memory, with an operating system and instructions stored in non-transitory memory such that the adaptive router 110 may be configured to function as a special-purpose computer to provide the intelligent routing features in accordance with various embodiments disclosed herein. The adaptive router 110 may differentiate and indicate different types of traffic at the OSI network layer, and intelligently route traffic suitable for a next-generation network (e.g., 5G wireless network and beyond), as well as other traffic. The adaptive router 110 may be configured to make better decisions and more efficiently handle a new type of data, such as data transmitted via 5G in accordance with ACP.

Additionally or alternatively, in various embodiments, one or more of the endpoint devices 116 may include the adaptive router 110 in whole or in part or otherwise be configured to provide the functionality of the adaptive router 110 in whole or in part to the respective endpoint device 116 itself and/or to one or more other endpoint devices 116. Likewise, in various embodiments, one or more of the endpoint devices 116 may include the modem 112 in whole or in part or otherwise be configured to provide the functionality of a modem in whole or in part to the respective endpoint device 116 itself and/or to one or more other endpoint devices 116. As such, various embodiments of the endpoint devices 116 may communicate with the networks 120 directly and/or indirectly via a separate adaptive router 110.

Each adaptive router 110 may be configured to identify received transmissions in particular types of protocols and then route the different types of packets differently, with prioritization and different network slicing based at least in part on packet type. Accordingly, the adaptive router 110 may provide more flexibility at the network layer so that the adaptive router 110 can make better decisions, particularly as far as new packet types. The intelligence of and logic of the adaptive router 110 at the transport layer (a less expensive layer) facilitates provides a smarter, more robust router for extension and transition to 5G wireless network abilities, and to handle the type of traffic indicated by the transport layer, instead of at the OSI session layer which would add more overhead to the entire network in order to determine the type of traffic. With disclosed embodiments, the adaptive router 110 may enable more optimized allocation of bandwidth depending on type of traffic according to traffic pattern (type as a function of time/day/date).

By way of example, when the adaptive router 110 receives a message from the networks 120, the adaptive router 110 may peel back one layer of that data message and identify the type of content. For instance, upon packet inspection, the adaptive router 110 may identify ACP packets. ACP may allow for clearly initiating a session that is related to video. As part of facilitating the efficient data transport, ACP may facilitate the rapid exchange of content delivery through the cloud, what can be stored natively on the endpoint device 116, what can be configured end-to-end ahead of time, and what can be stored at various OSI layers to make the video transport efficient.

Video may be transmitted via, e.g., the 5G wireless network 120 as native IP packets for a video transport method (per the ATSC 3.0 standard or a like protocol). To transmit video, the video may be encapsulated in a number of headers and containers to provide the IP packets, which adds more overhead so an endpoint device 116 must pass the packets all the way up through the OSI layers to the presentation layer. Only a fraction of a given packet is video; the rest is essentially "instructions" to other layers to ensure communication. Stated otherwise, to set up a multimedia connection in the conventional way, the necessary operations involve traversing up through all the OSI layers when there is a request to watch video: identifying the physical structure, opening up the data link, transmitting through the network and through the transport, opening up a session, opening up a presentation instance, and then opening up the application. The microseconds accumulated with all that authentication and exchange on the backend and with maintaining some of those connections and exchanges on the backend. For example, with streaming of video chunks, there may be repeated user verification, repeated connection validation, repeated checking that the connection is still up, and repeated commands to keep streaming—repetitions of at least four different logic exchanges to maintain what appears to a user to be a single session and experience, including a tickle stream for continual authentication/authorization. This may correspond to a significant amount of overhead contributing to network traffic.

By contrast, disclosed embodiments may be configured to employ the ACP protocol to facilitate real-time media transfers that reduce such overhead, remove bytes from media transactions, and eliminate a significant amount of network traffic, thereby adding value to the network chain. The ACP protocol, a video communications packet protocol lower in the OSI layers, further facilitates an IP-based video packet delivery system. Using the innovative protocol with respect to transport and session layers, disclosed embodiments may facilitate identification of types of streams and intra-stream identification of packet types, as well as identification of source and destination, and addition of layers of security. Disclosed embodiments may include utilizing the network layer and the transport layer to set up for one or more sessions in the session layer so that sufficient data and instructions are provided to open a valid session. Rather than negotiations occurring primarily at the session layer, the adaptive router 110 may negotiate agreement mostly at the transport layer and the network layer to confirm that a particular endpoint device 116 and/or user of the endpoint device 116 is authorized and decide whether the connection is open, broadcast, etc. Advantageously, the negotiations may be performed as part of a configuration session disclosed herein that does not utilize the presentation layer and the application layer, and may only minimally utilize the session layer—much less than any conventional approaches.

Also advantageously, disclosed embodiments may leave the session alive and/or otherwise provide for asynchronous sessions with asynchronous exchange. In the transport layer, disclosed embodiments may add enough information so that, once the session is established, it stays up. Further, negotiations may be set up and then have the actual content transactions that go up through the application layer occur later. So, as long as the negotiations occur in advance, one or more new sessions can be established which utilize the same negotiations (e.g., from a prior session) and then take the content transactions up to the application layer.

Accordingly, one or more asynchronous sessions may be set up within the transport layer. The session layer may be instructed to use the setup, having sufficient data and instructions to maintain and/or open a valid session, for later, which can extend over hours, days, weeks, etc. and/or different sessions. As such, disclosed embodiments configured to operate according to the ACP protocol may not be restricted to a single session for the transport that has been set up, with disclosed embodiments providing for a one-to-many negotiations-to-sessions relationship. Such embodiments may yield speed and efficiency gains for exchanging network content on demand with multiple asynchronous verified sessions. Notably, the optimizations provided by disclosed embodiments include optimizing at layers lower than the session layer, in contrast to other possible approaches, with asynchronous transactions going across the transport to create a single application experience.

After the media device 118 receives data via the network interface and hands the data off to the data link layer and the network layer to analyze. At the network layer, the media device 118 may read an instruction included in ACP packets to identify the packets as conforming to the ACP protocol, which handles part of the communications and the preparation work so that more video packets can be passed per set of transactions. The media device 118 may identify one or more ACP processes appropriate for the ACP packets. At the transport layer, the media device 118 may operate according to the ACP protocol to make a more efficient end-to-end connection, further reducing what is passed up to the session layer. Moreover, while disclosed embodiments optimize the transport layer and network layer, the disclosed embodiments may allow for adaptability with respect to variations and evolutions of the physical layer as content provider systems 102 may continue to signal within the media provided what type of content it is and utilize the data link to indicate physical addressing (e.g., origin and destination) regardless of the variations and evolutions of the physical layer.

Figure 3:
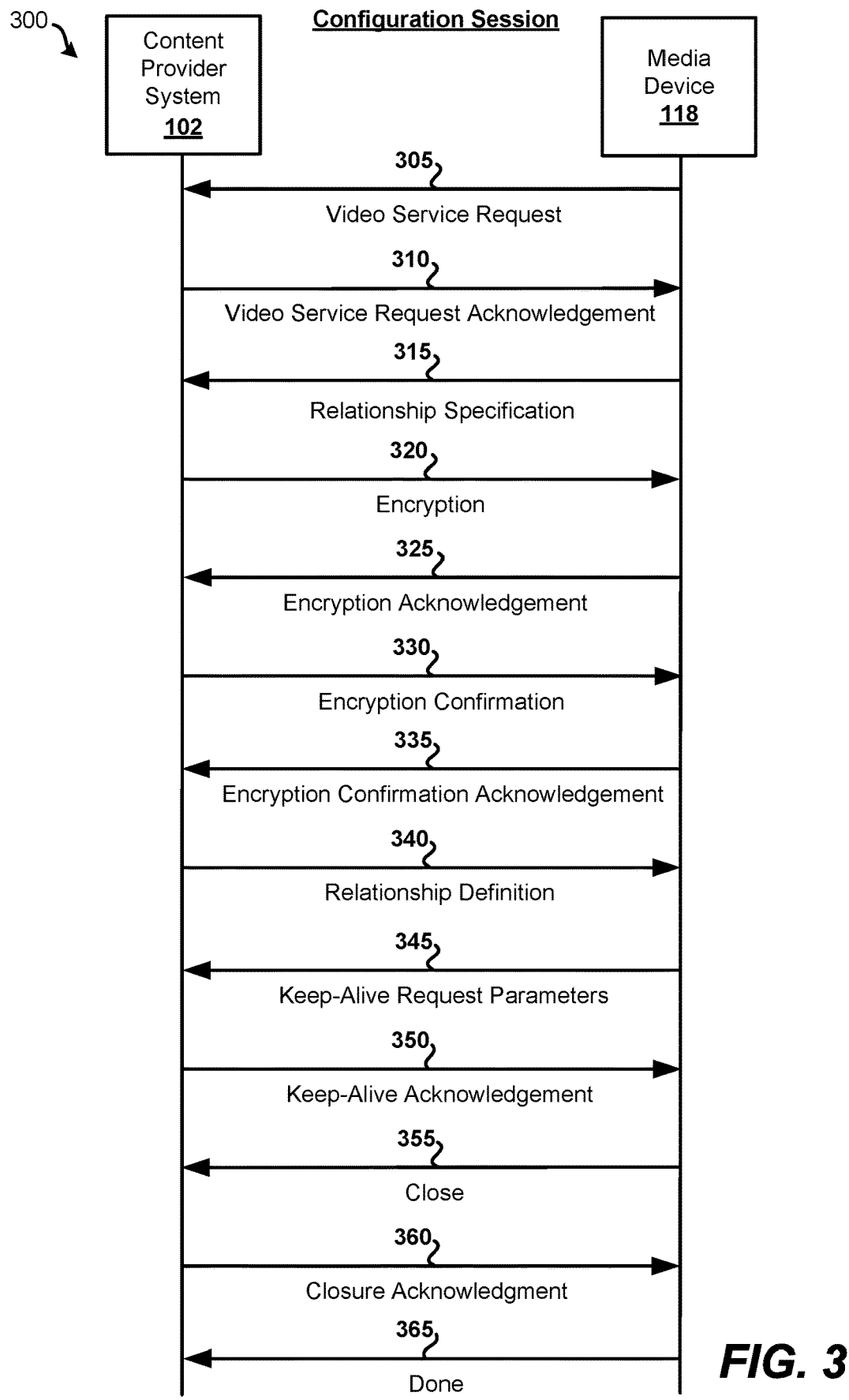
FIG. 3 illustrates an operational flow diagram for a configuration session to facilitate asynchronous real-time media transfer, in accordance with disclosed embodiments of the present disclosure.
Figure 4:
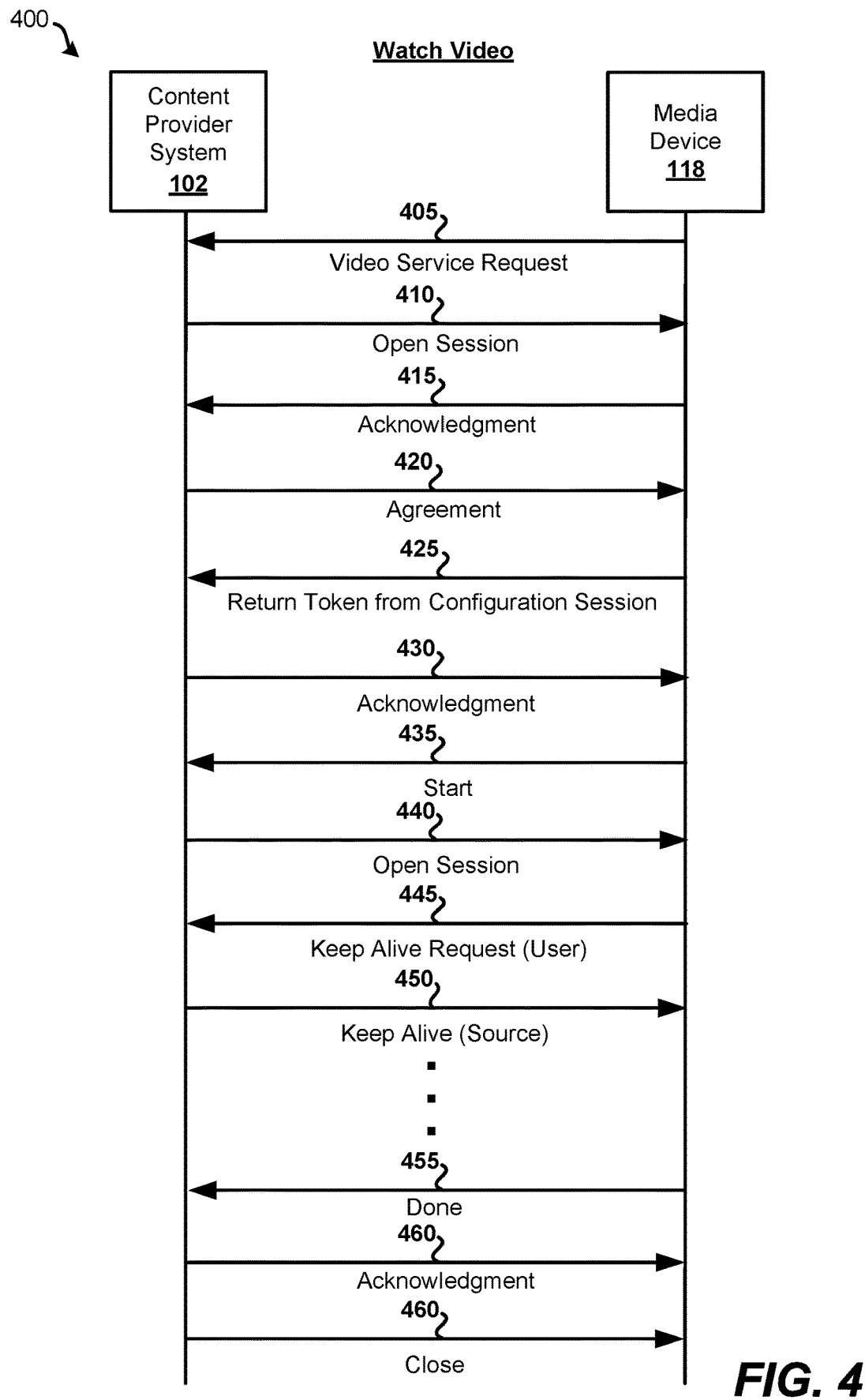
FIG. 4 illustrates an operational flow diagram for an asynchronous real-time media transfer process to facilitate asynchronous real-time media transfer to allow an end user to view video content from a content provider system, in accordance with disclosed embodiments of the present disclosure.

To illustrate the above features, FIGS. 3 and 4 depict operational flow diagrams to establish and support asynchronous sessions and asynchronous exchange. FIG. 3 illustrates an operational flow diagram for a configuration session 300 to facilitate asynchronous real-time media transfer, in accordance with embodiments of the present disclosure. FIG. 4 illustrates an operational flow diagram for an asynchronous real-time media transfer process 400 to facilitate asynchronous real-time media transfer to allow an end user to view video content from a content provider system 102, in accordance with embodiments of the present disclosure. For illustration, the configuration session 300 and the asynchronous real-time media transfer process 400 take the use case of an end user of an endpoint device 116 requesting video (e.g., audiovisual content, digital TV, movies, shows, etc.) from one of the content provider systems 102. The operational flow diagrams may encapsulate the various embodiments where the endpoint device 116 may include the adaptive router 110 and/or the modem 112 in whole or in part, be separate therefrom, and/or may be otherwise be configured to have the functionality of the adaptive router 110 and/or the modem 112 in whole or in part. Accordingly, the operational flow diagrams illustrates communication between the content provider system 102 and a media device 118, which may include the adaptive router 110, the transceiving equipment 190, and/or the endpoint device 116.

Referring to FIG. 3, the configuration session 300 may correspond to configuring the media device 118 for asynchronous real-time media transfer in accordance with the ACP protocol, including executing authorization and encryption operations. The execution of the configuration session 300 may configure the media device 118 to provide an asynchronous session within which video content is subsequently transferred from a content provider system 102 to the media device 118 via the network(s) 120. With the configuration session 300, advance arrangement of transactions may enable subsequent video transactions between the content provider systems 102 and the media device 118 to be more efficient, for example, with advanced preparation of authorization and encryption. As a result of the configuration session 300, negotiations between the content provider system 102 and the end user may be set up ahead of time to facilitate a plurality of sessions with a one-to-many negotiations-to-sessions scheme.

As indicated by communication 305, the media device 118 may transmit a video service request, which may correspond to an indication of one or more selections of one or more user-selectable options presented with an endpoint device 116. The video service request may, for example, correspond to a user indicating a request to purchase a video service and/or content item, to register for the same, and/or otherwise to access the same. With some instances, the video service request may begin the configuration session 300, initiating the various operations of the configuration session 300 that follow the video service request. In response, the content provider system 102 may acknowledge the video service request, as indicated by communication 310.

Consequently, specifications of asynchronous session parameters may be created to define delivery operations for subsequent delivery of the video content with the asynchronous session. For example, as indicated by communication 315, the media device 118 may transmit a specification of the relationship of the end user with respect to the content provider system 102. The specification may be consequent to user selection of one or more selections of one or more user-selectable options presented with the endpoint device 116. The media device 118 may, for example, specify a subscription relationship for video service any suitable time period (e.g., month, year, etc.), an on-demand relationship for a set of one or more content items (e.g., a one-off purchase), an registration for freely accessible (i.e., non-subscription) content, and/or the like to facilitate establishing the relationship desired.

As indicated by communications 320, 325, 330, and 335, disclosed embodiments may encapsulate encryption. As indicated by communications 320, the content provider system 102 may set up and specify the encryption. As indicated by communication 325, the media device 118 may transmit encryption acknowledgement in return. As indicated by communication 330, the content provider system 102 may transmit confirmation of the encryption. As indicated by communication 335, the media device 118 may transmit encryption confirmation acknowledgement.

As indicated by communication 340, the content provider system 102 may transmit the relationship definition corresponding to the specified relationship. Accordingly, the configuration session 300 may provide the ability to assume that an end user of the media device 118 may never have an account with the content provider system 102, may or may not desire a subscription account with the content provider system 102, but still provide for agreement and encryption that will govern the relationship. As such, the ACP protocol may be all encapsulating for individual end user such that backend information is not needed. Yet, the end user could set up permanent relationship or just a temporary relationship (e.g., watching TV at a bar). Because the ACP protocol is a lower-level protocol, the protocol provides for configuration flexibility that is not restriction based on whether or not the end user registers an account. By the optimizing the protocol for the lower layers and by not involving the presentation layer, the ACP protocol may be able to provide such flexibility so that the real-time media transfer is streamlined, like turning on over-the-air TV. If the end user indicates a desire to establish a permanent relationship, then the media device 118 may pass a packet up to the application layer of the media device 118, which would open up an appropriate protocol (e.g., an http session that provides for creating a user name, password, etc.). However, if the end user indicates a temporary relationship (e.g., just watching TV, an on-demand event, etc.), then the media device 118 may restrict operations to the session layer and lower layers of the media device 118.

The operations of the configuration session 300 may be performed at the lower layers such that the presentation layer and the application layer are not utilized. Further, the session layer may only be minimally utilized to pass keep-alive parameters up to the session layer without opening a session. For example, as indicated by communication 345, the media device 118 may transmit keep-alive request parameters, and the content provider system 102 may transmit acknowledgement of the same, as indicated by communication 350. The keep-alive request parameters may, in some embodiments, be based at least in part on the specified relationship. For example, various embodiments may provide for leaving one or more sessions alive for a specified period of time (e.g., hours, days, weeks, months, the duration of a live event, etc.) and/or otherwise provide for asynchronous sessions. The keep-alive request parameters may facilitate keep-alive agreement including rules for handling video session maintenance, continuous reception, discontinuities, when and under which circumstances to keep presenting, and/or the like. Then, as indicated by communications 350, 355, and 360, the configuration session 300 may be closed.

With the setup of transport to make a different kind of connection using a different kind of data protocol, in some embodiments, the content provider system 102 may create and transmit to that media device 118 an encryption token to confirm the encryption agreed to use. In alternative embodiments, the media device 118 may create the encryption token and transmit it to content provider system 102. The token may correspond to the key that will be subsequently used to ensure encryption with other sessions established using the same key. The token in the logic may allow the media device 118 (e.g., the adaptive router 110 and/or the endpoint device 116) to detect that subsequent traffic is authenticated, so that the media device 118 can use the ACP protocol with the traffic. With the setup, packet list, protocol, header checksum, and similar identification may be handled so that, in future packets, instead of additional identification that would contain IP address, source router, etc., the token may be provided so that identification becomes much smaller. Further, passing the token lower down the layers in the transport layer makes interception of and access to the token more difficult.

In various embodiments, the token may include encrypted indicia of the asynchronous session parameters, such as one or a combination of the video service requested, the relationship definition, the encryption agreed upon, the keep-alive agreements, and/or the like agreements. Thereafter, the token and the asynchronous session parameters may be leveraged for subsequent interactions between the content provider system 102 and the end user. For example, as detailed below with the transfer session 400, an asynchronous session may be opened at least in part by transmitting the encrypted token to the content provider system 102 via the network(s) 120 from the transport layer of the media device 118, with the asynchronous session then being started at the session layer of the media device 118 for delivery of video packets corresponding to the video content from the content provider system 102 to the media device 118 in accordance with the specifications of the asynchronous session parameters. In various embodiments, the token may be any suitable secure token, key, string, code, identifier and/or the like data structure containing token parameters indicating one or a combination of the agreement specifications. In some embodiments, where one or more of those agreements are not explicitly indicated in the token, the content provider system 102 may store specifications of such configuration information in storage (e.g., a table, database, etc.) and indexed with respect to a key specified by the token for subsequent matching when the token is used by the media device 118 to subsequently request video content from the content provider system 102 in accordance with an asynchronous real-time media transfer process 400, referring to FIG. 4. Accordingly, for one or more asynchronous real-time media transfer processes 400, the governing agreement specifications may be very small in size with such agreement already determined and established, which reduces the amount of data needing to be attached to packets for the transfer processes 400 and results in gained efficiencies.

Further, the token may be passed to the session layer of the endpoint device 116 in order to keep the user's place for when the user returns. Next time, to pick up the session where the user left off, the media device 118 may pass the token so that the negotiation is already done to open the session, and the content provider system 102 can determine that the token is still watching, instead of having to determine that the particular user is still watching, determining that the user is using a particular data link from a particular location.

With reference to the example of FIG. 4, the asynchronous real-time media transfer process 400 may begin with the media device 118 transmitting a video service request, which may correspond to an indication of one or more selections of one or more user-selectable options presented with the endpoint device 116, as indicated by communication 405. In some instances, the video service request may be the same request that initiated the configuration session 300 such that media transfer process 400 is a continuation of session 300. In such instances, the session 300 may not need to close, but instead may transition to the media transfer 400. Such may be the case when an end user select an option to immediately view content (e.g., as would often be the case with one-off viewing of content). Yet, in other instances, the media transfer process 400 may be separate from the configuration 300, with the session 300 having been closed and, for example, some time passing before the media transfer process 400 is initiated. Such may be case when, for example, the end user does not select to immediately access content and/or when an instance of the media transfer process 400 is one of multiple sessions leveraging the single configuration session 300. In such instances, the video service request of communication 405 may be separate and in addition to the video service request 305. As indicated by communication 410, the content provider system 102 may initiate opening a session consequent to the video service request, and the media device 118 may acknowledge in return, as indicated by communication 415.

As indicated by communication 410, the content provider system 102 may prompt the media device 118 to indicate acceptance of previously agreed terms. In response, the media device 118 may return an instance of the token, created with the configuration session 300 and stored by the media device 118, to indicate acceptance, as indicated by communication 425. As indicated by communication 430, the content provider system 102 may acknowledge in return. In this way, the transport layer operations may be optimized to minimally and sufficiently communicate via the networks 120 to confirm authentication, and confirm authorization to receive the signal and communicate, so that a session may then be established. Accordingly, with disclosed embodiments allowing for asynchronous transport by way of the transport layer, such asynchronicity at the lower layer may ensure increased network and process efficiencies.

Then, the media device 118 may transmit an indication to start the transfer of the requested video content, as indicated by communication 445. The content provider system 102 may open the session for the transfer of the video content and begin transmitting the content, as indicated by communication 450. While the content is being transmitted, the media device 118 may send keep-alive requests at one or more intervals, as indicated by communication 455. And the content provider system 102 may send keep alive confirmations, as indicated by communication 460. With packets conforming to the ACP protocol, traffic that is data only may be more easily separated out. When the media device 118 receives a message from the networks 120, the media device 118 may peel back one layer of that data message and identify the type of content. When the media device 118 identifies ACP packets upon packet inspection, the media device 118 may transition to the media transfer process 400 to transfer the ACP packets. In some embodiments, the identification of the types of packets may be at the session layer of the media device 118 and may include identifying that this is a video type of session, follows specified sessions rules (bi-cast, unicast, multicast, etc.), and whether the packet is sufficiently encrypted. When the content transfer is complete or when the end user selects an option that corresponds to a stop of the transfer, the media device 118 may transmit a done message, as indicated by communication 455. The content provider system 102 may then acknowledge and close the session, as indicated by communications 460 and 465.

With transfer process 400, what may go up to the presentation layer of the endpoint device 116 may be the token. The presentation layer of the endpoint device 116 may determine what do with token—whether it stops at the presentation layer to prepare a presentation for the end user as in the case of opening up a video application to watch video, or goes up to the application layer of the endpoint device 116 and opens up/calls a session (e.g., web browser/HTTP session) as in the cases of an end user modifying predetermined options/agreements, errors, and/or the like. With the stop at the presentation layer, because the agreed authorization, encryption, relationship definition, and/or the like are predetermined by the configuration session 300 and the session is governed by the ACP protocol, not only is there a reduction in the amount of extra data attached to packet, but also the transactions do not need to progress into all OSI layers, thereby saving time. Consequently, a session may be opened up, establishing and demonstrating a valid connection. With disclosed embodiments, video may be transmitted via the network 120 so that opening a web session is not necessary to do so. Thus, both transactional data and operational sequences may be leaner.

Further, as disclosed herein, embodiments may allow for multiple threads to be open simultaneously to facilitate the asynchronous transfer. Advantageously, this may allow for ack/nak processes to occur outside the normal transport flows, illustrated for example with respect to FIGS. 3 and 4, within a negotiated interval. By way of example, this may allow for credentials to be updated as an asynchronous transfer that does not interrupt a current stream, such as the streaming of video with the open transfer session of the transfer process 400. In some instances, credentials may be updated in the middle of a transfer session in response to a detection of a breach. For example, an ISOC (Information Security Operations Center) of a provider system 102 may detect a breach within an application or a set of one or more devices that requires update of credentials. Instead of requiring an interruption of the current session so the viewing application can be updated followed by opening a new session, embodiments may utilize ACP to renegotiate credentials that are part of the encryption chain with an asynchronous session so that the viewing experience may be maintained without interruption before, during, and after the renegotiation has passed up through the stack and has been completed. In some embodiments, the asynchronous session may correspond to one or more operations of the configuration session 300 being executed while the transfer stream is maintained to create a new encryption token indicating the updated credentials. The media device 118, employing ACP with the asynchronous session, may communicate with the provider system 102 to establish that the new encryption token be used with the subsequent session after the current transfer session has completed. However, in some embodiments, the media device 118 may communicate with the provider system 102 to provide the option to the provider system 102 to terminate the current transfer session and use the new encryption token immediately or allow the current transfer session to complete and then use the new encryption token at the next session.

Figure 5:
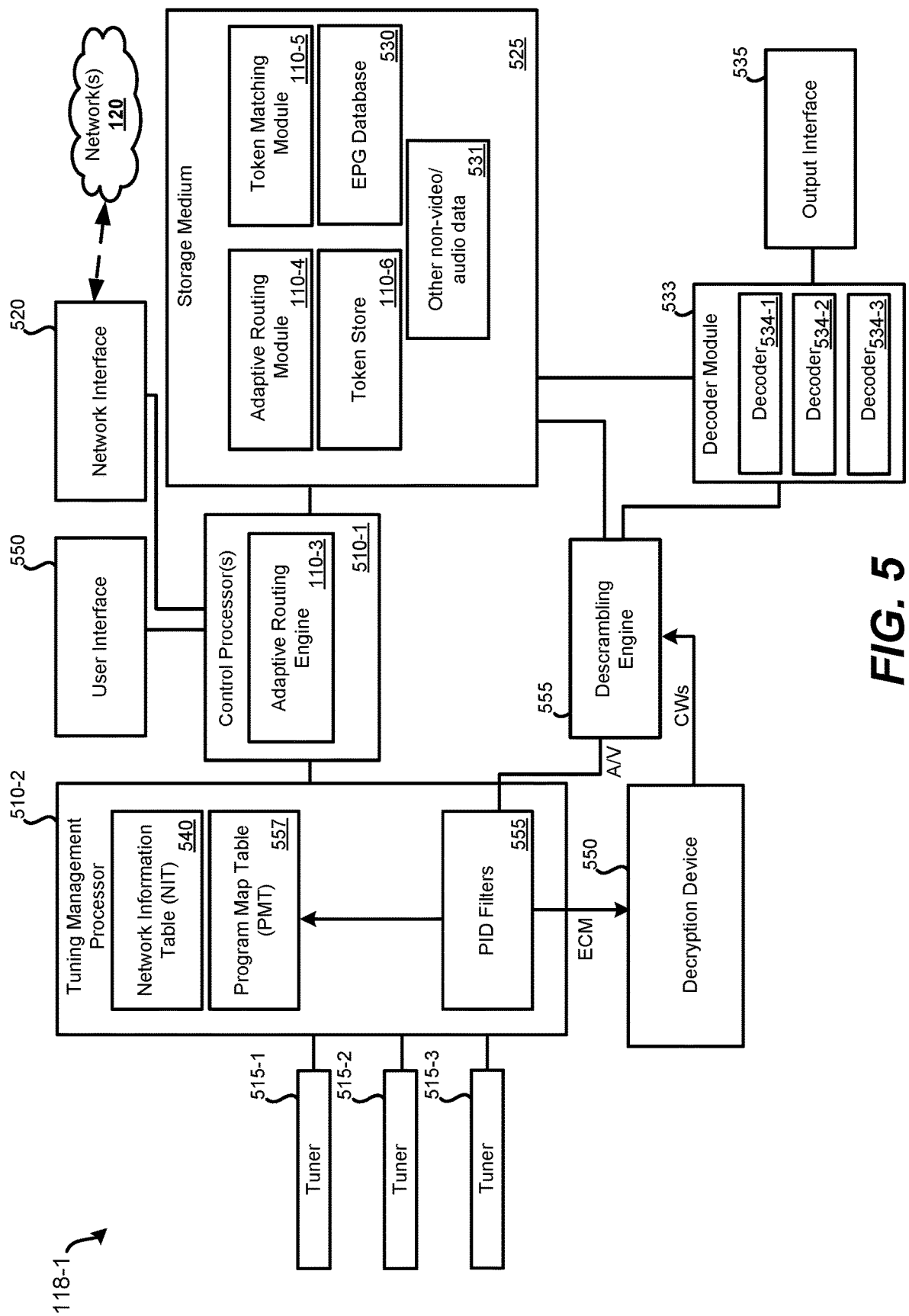
FIG. 5 illustrates a receiver that may correspond to an endpoint device and may be configured to provide the functionality of the transceiving subsystem, in accordance with disclosed embodiments of the present disclosure.

FIG. 5 illustrates a receiver 118-1 that may correspond to an endpoint device 116 and may be configured to provide the functionality of the transceiving subsystem 185 in whole or in part, in accordance with disclosed embodiments of the present disclosure. Certain embodiments of the receiver 118-1 may include set top boxes (STBs), television receivers, and over-the-top receivers. In some embodiments, the receiver 118-1 may correspond to the television receiver 110. In various embodiments, in addition to being in the form of a STB, a receiver may be incorporated as part of another device, such as a television or other form of display device, such as a computer, smartphone, tablet, or other handheld portable electronic device. For example, a television may have an integrated receiver (which does not involve an external STB being coupled with the television). An adaptive routing engine 110-3 may be provided in conjunction with an adaptive routing module 110-4, a token matching module 110-5, and/or a token store 110-6, to implement at least some of the functionalities of the transceiving subsystem 185, such as the functionalities of the adaptive router 110, into the receiver 118-1.

The receiver 118-1 may communicate with a display device such as a television. The receiver 118-1 may be incorporated as part of a television, such as the display device 116-5 of FIG. 2. The receiver 118-1 may include:

processors 510 (which may include control processor 510-1, tuning management processor 510-2, and possibly additional processors), tuners 515, network interface 520, non-transitory computer-readable storage medium 525, EPG (electronic programming guide) database 530, networking information table (NIT) 540, user interface 550, decryption device 560, decoder module 533, interface 535, and/or descrambling engine 565. In other embodiments of receiver 118-1, fewer or greater numbers of components may be present. It should be understood that the various components of receiver 118-1 may be implemented using hardware, firmware, software, and/or some combination thereof. Functionality of components may be combined; for example, functions of descrambling engine 565 may be performed by tuning management processor 510-2. Further, functionality of components may be spread among additional components; for example, PID filters 555 may be handled by separate hardware from program map table 557. The receiver 118-1 may be in data communication with service providers, such as by way of network interface 520.

The storage medium 525 may represent one or more non-transitory, computer-readable storage mediums. The storage medium 525 may include memory and/or a hard drive. The storage medium 525 may be used to store information received from information received via the network interface 520 and/or one or more satellites. The storage medium 525 may store information related to the adaptive routing module 110-4, token matching module 110-5, token store 110-6, EPG database 530, and/or other non-video/audio data 531. The storage medium 525 may also store DVR database and received video content. For example, the storage medium 525 may store and/or video content received via the transfer process 400 to facilitate playback of the video content. Various types of content may be provided via the transfer process 400 and downloaded to the storage medium 525, with various playback rights granted to playback the content. For example, the playback rights may specify restrictions for playing such that the content may require an active subscription with the provider system, the content may only be played with a particular application, etc. In instances where rights to playback video content are not granted in perpetuity, ACP may facilitate a fast authorization check that is faster than conventional authorization checks. The token disclosed herein may be compressed and stored along with metadata of the stored video content, and may specify authorization parameters that were established with the configuration session 300. Upon initiation of playback of the content, the toke may be inspected so that authorization of playback rights is quickly verified, thereby obviating any need for network communications with a provider system and any extraneous processing at the higher OSI layers.

The network interface 520 may be used to communicate in accordance with embodiments disclosed herein. For example, the network interface 520 may correspond at least in part to the transceiving equipment 190. The network interface 520 may facilitate the communications with the systems 102, 103 via the networks 120. The control processor 510-1 may communicate with the network interface 520 and the user interface 550. In some embodiments, the control processor 510-1 may also communicate with tuning management processor 510-2.

The control processor 510-1 may handle communications transceived via network interface 520, including communications related to the configuration session 300, the transfer process 400, and other aspects related to the ACP protocol. The control processor 510-1 may handle incoming data from the network interface 520, including network transport streams received from the user interface 550, which may include user input received by way of one or more human interface devices. The receiver 118-1 configured with the adaptive routing engine 110-3 and/or the adaptive routing module 110-4 may perform the adaptive routing features disclosed herein. Tokens, keys, strings, codes, identifiers and/or the like data structures created in accordance with the embodiments disclosed herein (e.g., in conjunction with configuration session 300) may also be stored in the storage medium 525 (e.g., in token store 110-6). The adaptive routing engine 110-3 may include a token matching engine that, in conjunction with a token matching module 110-5, may be configured to analyze, classify, categorize, characterize, tag, and/or annotate video content items, tokens, and/or the like.

When a token, for example, is created, the adaptive routing engine 110-3 and/or the adaptive routing module 110-4 may store the token in the token store 110-6 and may augment the token with metadata to facilitate subsequent matching and retrieval by the token matching engine (e.g., as part of an instance of asynchronous real-time media transfer process 400) with video content and/or a content provider system 102. The metadata may, for example, map the token (e.g., a token identifier and/or storage location) to an identifier of a particular item of video content, an identifier of a particular content provider system 102, an identifier of a particular agreement, and/or the like. In some embodiments, the metadata may correspond to tag data for a tag assigned to the token. The tokens and/or the associated metadata may be stored in one or more tables, indexes, trees, and/or the like. As part of the asynchronous real-time media transfer process 400, the token matching engine may, for example, identify a particular item of video content, content provider system 102, and/or agreement corresponding to a video service request, and may match an identifier of the particular item of video content, content provider system 102, and/or agreement to metadata associated with a particular token stored in the token store 110-6. Then, the receiver 118-1 may return the matching token as part of the process 400.

The processors 510 may include those configured to perform processes such as tuning to a particular channel, the configuration session 300, the transfer process 400, other aspects related to the ACP protocol, and/or receiving and processing input from a user. The processors 510 may include one or more processors dedicated to decoding video signals from a particular format, such as MPEG, for output and display on a television and for performing decryption, and/or the like. It should be understood that the functions performed by various modules of FIG. 5 may be performed using one or more processors. As such, for example, functions of the descrambling engine 565 may be performed by the control processor 510-1.

The tuners 515 may include one or more tuners used to tune to transponders that include broadcasts of one or more television channels that may be received from a satellite or cable system, for example. In the illustrated embodiment of receiver 118-1, three tuners are present (tuner 515-1, tuner 515-2, and tuner 515-3). In other embodiments, two or more than three tuners may be present, such as four, six, or eight tuners. Each tuner contained in the tuners 515 may be capable of receiving and processing a single transponder stream from a satellite transponder at a given time, for example. As such, a single tuner may tune to a single transponder stream at a given time. The tuners 515 may receive commands from the tuning management processor 510-2. Such commands may instruct the tuners 515 which frequencies are to be used for tuning.

The EPG database 530 may store information related to television channels and the timing of programs appearing on such television channels. The EPG database 530 may be stored using the storage medium 525, which may be a hard drive. Information from the EPG database 530 may be used to inform users of what television channels or programs are popular and/or provide recommendations to the user. Information from the EPG database 530 may provide the user with a visual interface displayed by a television that allows a user to browse and select television channels and/or television programs for viewing and/or recording. Information used to populate the EPG database 530 may be received via the network interface 520. For instance, updates to the EPG database 530 may be received periodically. The EPG database 530 may serve as an interface for a user to enable viewing and/or recording of multiple television channels simultaneously. Information from EPG database 530 may be output as a video stream to a display device. A particular user may issue commands indicating that an EPG interface be presented. A user issuing a command that an EPG be displayed may constitute a change command.

The network information table (NIT) 540 may store information used by the receiver 118-1 to access various television channels. The NIT 540 may be stored locally by a processor, such as the tuning management processor 510-2 and/or by the storage medium 525. Information used to populate the NIT 540 may be received via satellite (or cable) through the tuners 515, may be received via the network interface 520, such as from the television service provider. As such, information present in the NIT 540 may be periodically updated. In some embodiments, NIT 540 may be locally-stored by the receiver 118-1 using the storage medium 525. Generally, the NIT 540 may store information about a service provider network. Information that may be present in the NIT 540 may include: content provider system identifiers, television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or sub-channel identifiers for various television channels.

While a large portion of storage space of the storage medium 525 may be devoted to storage of television programming, a portion may be devoted to storage of non-audio/video data, such as the EPG database 530 and other non-video/audio data 531. This "other" data may permit the receiver 118-1 to function properly. In some embodiments, at least ten gigabytes are allocated to such other data. For example, if the NIT 540 is stored by the storage medium 525, it may be part of the other non-video/audio data 531.

The decoder module 533 may serve to convert encoded video and audio into a format suitable for output to a display device. For instance, the decoder module 533 may receive MPEG video and audio from the storage medium 525, the network interface 520, or the descrambling engine 565 to be output to a television. MPEG video and audio from the storage medium 525 may have been recorded to a DVR database as part of a previously-recorded television program. The decoder module 533 may convert the MPEG video and audio into a format appropriate to be displayed by a television or other form of display device and audio into a format appropriate to be output from speakers, respectively. The decoder module 533 may have the ability to convert a finite number of television channel streams received from the storage medium 525, the network interface 520, or the descrambling engine 565 simultaneously. For instance, each of the decoders 534 within the decoder module 533 may be able to only decode a single television channel at a time. While a television channel is being decoded by a decoder of the decoders 534, the television channel is not necessarily output to a display device via the television interface 535.

The television interface 535 may serve to output a signal to a television (or another form of display device) in a proper format for display of video and playback of audio. As such, the television interface 535 may output one or more television channels, stored television programming from the storage medium 525 (e.g., television programs from a DVR database, television programs from on-demand programming and/or information from the EPG database) to a television for presentation.

The user interface 550 may include a remote control (physically separate from the receiver 118-1) and/or one or more buttons on the receiver 118-1 that allow a user to interact with the receiver 118-1. The user interface 550 may be used to select a television channel for viewing, view information from the EPG database 530, and/or program a timer stored to a DVR database, wherein the timer is used to control the DVR functionality of the control processor 510-1. The user interface 550 may also be used to transmit commands to the receiver 118-1 and make user selections to customize user preferences, make video service requests, and/or the like.

Referring back to the tuners 515, television channels received via satellite (or cable) may contain at least some scrambled data. Packets of audio and video may be scrambled to prevent unauthorized users (e.g., nonsubscribers) from receiving television programming without paying the television service provider. When a tuner of the tuners 515 is receiving data from a particular transponder of a satellite, the transponder stream may be a series of data packets corresponding to multiple television channels. Each data packet may contain a packet identifier (PID), which, in combination with the NIT 540 and/or the PMT 557, may be determined to be associated with a particular television channel. Particular data packets, referred to as entitlement control messages (ECMs), may be periodically transmitted. ECMs may be associated with another PID and may be encrypted; the receiver 118-1 may use the decryption device 560 to decrypt ECMs. Decryption of an ECM may only be possible if the user has authorization to access the particular television channel associated with the ECM. When an ECM is determined to correspond to a television channel being stored and/or displayed, the ECM may be provided to the decryption device 560 for decryption.

The decryption device 560 may be a removable or non-removable smart card. When the decryption device 560 receives an encrypted ECM, the decryption device 560 may decrypt the ECM to obtain some number of control words. In some embodiments, from each ECM received by the decryption device 560, two control words are obtained. In some embodiments, when the decryption device 560 receives an ECM, it compares the ECM to the previously received ECM. If the two ECMs match, the second ECM is not decrypted because the same control words would be obtained. In other embodiments, each ECM received by the decryption device 560 is decrypted; however, if a second ECM matches a first ECM, the outputted control words will match; thus, effectively, the second ECM does not affect the control words output by the decryption device 560. The decryption device 560 may be permanently part of the receiver 118-1 or may be configured to be inserted and removed from the receiver 118-1. In some embodiments, the control processor 510-1, the tuning management processor 510-2, or other hardware may be able to determine that a received ECM has not changed from the previous iteration, and therefore not provide the repeated ECM to the smart card, since the same control word(s) will be obtained.

The tuning management processor 510-2 may be in communication with the tuners 515 and the control processor 510-1. The tuning management processor 510-2 may be configured to receive commands from the control processor 510-1. Such commands may indicate when to start/stop recording a television channel and/or when to start/stop causing a television channel to be output to a television. The tuning management processor 510-2 may control the tuners 515. From the tuners 515, the tuning management processor 510-2 may receive transponder streams of packetized data. From the network interface 520, the tuning management processor 510-2 may receive network transport stream of packetized data. As previously detailed, some or all of these packets may include a PID that identifies the content of the packet.

The tuning management processor 510-2 may be configured to create one or more PID filters 555 that sort packets received from the tuners 515 and/or the network interface 520 based at least in part on the PIDs. When a tuner is initially tuned to a particular frequency (e.g., to a particular transponder of a satellite), a PID filter may be created based at least in part on the PMT data. The PID created, based at least in part on the PMT data packets, may be known because it is stored as part of the NIT 540 or another table, such as a program association table (PAT). From the PMT data packets, PMT may be constructed by the tuning management processor 510-2.

The PID filters 555 may be configured to filter data packets based at least in part on PIDs. In some embodiments, the PID filters 555 are created and executed by the tuning management processor 510-2. For each television channel to be output for presentation or recorded, a separate PID filter may be configured. In other embodiments, separate hardware may be used to create and execute such PID filters. Depending on a television channel selected for recording/viewing, a PID filter may be created to filter: (1) the video packets associated with the television channel; (2) the audio packets associated with the television channel; and (3), if enabled, supplemental audio content for use in conjunction with interactive content. The PMT 557 may store the particular assignments of PIDs for individual television channels. The descrambling engine 565 may use the control words output by the decryption device 560 in order to descramble video and/or audio corresponding to television channels for storage and/or presentation. Video and/or audio data contained in the transponder data stream received by the tuners 515 may be scrambled. Video and/or audio data may be descrambled by the descrambling engine 565 using a particular control word. Which control word output by the decryption device 560 to be used for successful descrambling may be indicated by a scramble control identifier present within the data packet containing the scrambled video or audio. Descrambled video and/or audio may be output by the descrambling engine 565 to the storage medium 525 for storage (in the DVR database) and/or to the decoder module 533 for output to a television or other presentation equipment via the television interface 535.

For simplicity, the receiver 118-1 of FIG. 5 has been reduced to a block diagram; commonly known parts, such as a power supply, have been omitted. Further, some routing between the various modules of the receiver 118-1 has been illustrated. Such illustrations are for exemplary purposes only. The state of two modules not being directly or indirectly connected does not indicate the modules cannot communicate. Rather, connections between modules of the receiver 118-1 are intended only to indicate possible common data routing. It should be understood that the modules of the receiver 118-1 may be combined into a fewer number of modules or divided into a greater number of modules.

Further, the components of the television receiver 118-1 may be part of another device, such as built into a television. The television receiver 118-1 may include one or more instances of various computerized components, such as disclosed in relation to computer systems disclosed herein. While the television receiver 118-1 has been illustrated to include features of a satellite receiver, it is to be appreciated that techniques may be implemented in other types of television receiving devices, such as 5G wireless receivers, IPTV receivers, and/or the like without the features of a satellite receiver. In some embodiments, the television receiver 118-1 may be configured as a hybrid receiving device, capable of receiving content from disparate communication networks, such as satellite and next-generation networks 120. In some embodiments, the tuners may be in the form of network interfaces capable of receiving content from content providers systems 102 and 103 via next-generation networks 120.

Figure 6:
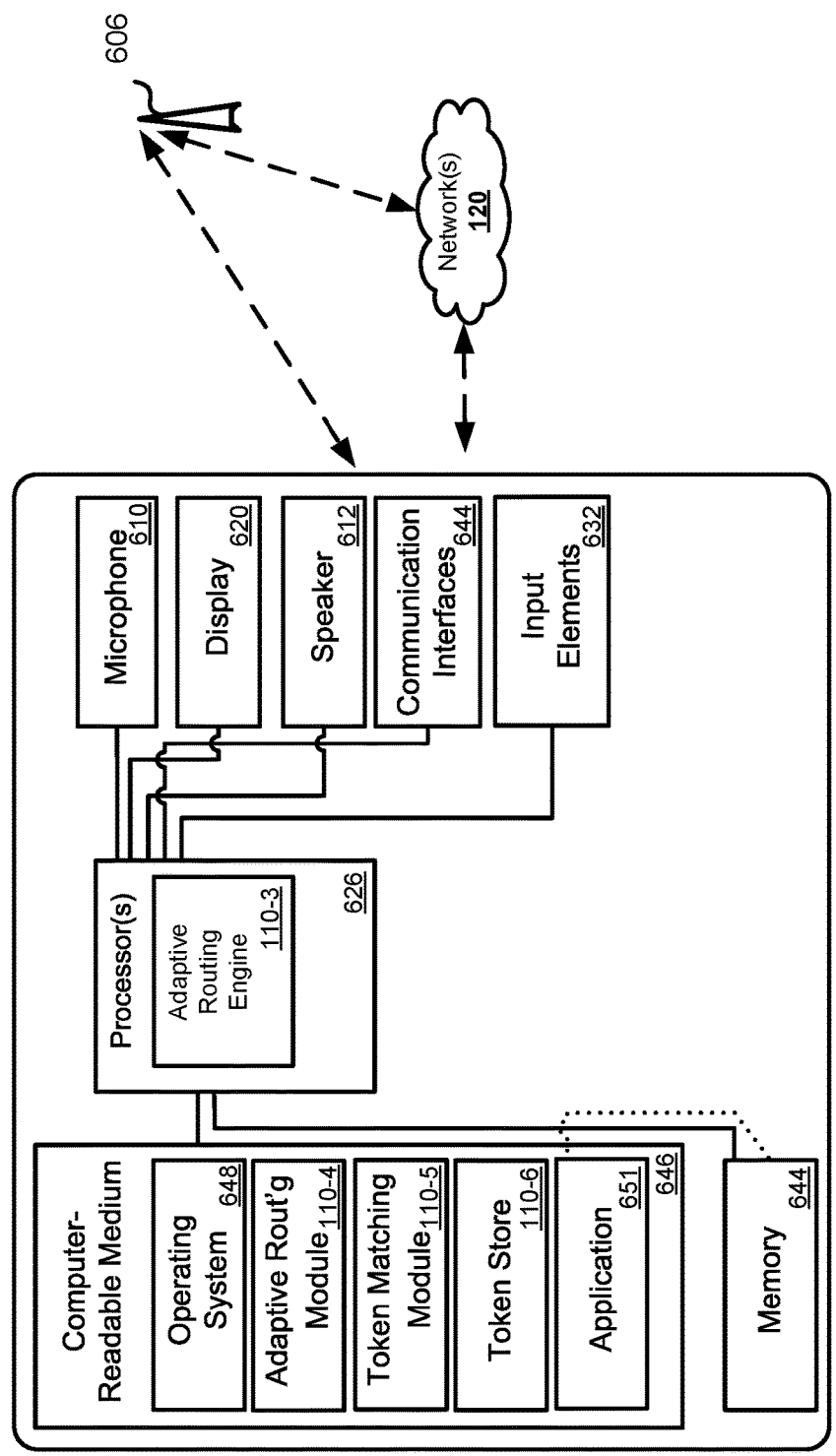
FIG. 6 illustrates a block diagram of another example media device that may correspond to an endpoint device, in accordance with disclosed embodiments of the present disclosure.

FIG. 6 is a block diagram of another example media device 118-2 that may correspond to an endpoint device 116, in accordance with disclosed embodiments of the present disclosure. The media device 118-2 may be a portable device configured to have the functionality of the adaptive router 110 and/or the modem 112 in whole or in part to communicate with the systems 102, 103 in accordance with embodiments described herein. For example, in various embodiments, the media device 118-2 may correspond to one or more of devices 116 depicted in FIG. 1.

The media device 118-2 may include at least one computer-readable medium 646 coupled to the processor 636, which stores application programs and other computer code instructions for operating the device, such as an operating system (OS) 648. In some embodiments, the application 651 may be stored in the memory 634 and/or computer-readable media 646.

In some embodiments, the media device 118-2 may be provided with an application 651, which may, in some embodiments, correspond to a mobile application configured to run on the media device 118-2 to facilitate various embodiments of this disclosure. In various embodiments, the media device 118-2 configured with the application 651 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 6, the media device 118-2 includes a display 620 and input elements 632 to allow a user to input information into the media device 118-2. By way of example without limitation, the input elements 632 may include one or more of a keypad, a trackball, a touchscreen, a touchpad, a pointing device, a microphone, a voice recognition device, or any other appropriate mechanism for the user to provide input.

The user selection of a user-selectable option corresponding to the application 651 may involve any one or combination of various user inputs. The user selection may be in the form of a keyboard/keypad input, a touch pad input, a track ball input, a mouse input, a voice command, etc. For example, the content object may be selected by the user by pointing and clicking on a content object. As another example, a content object may be selected by an appropriate tap or movement applied to a touch screen or pad of the media device 118-2.

The media device 118-2 includes a memory 634 communicatively coupled to a processor 636 (e.g., a microprocessor) for processing the functions of the media device 118-2. The media device 118-2 may include at least one antenna 638 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The media device 118-2 may also include a microphone 640 to allow a user to transmit voice communication through the media device 118-2, and a speaker 642 to allow the user to hear voice communication. The antenna 638 may include a cellular antenna (e.g., for sending and receiving cellular voice and data communication, such as through a network such as a 3G, 4G, or 5G network). In addition, the media device 118-2 may include one or more interfaces in addition to the antenna 638, e.g., a wireless interface coupled to an antenna.

The communications interfaces 644 can provide a near field communication interface (e.g., contactless interface, Bluetooth, optical interface, infrared interface, etc.) and/or wireless communications interfaces capable of communicating through a cellular network, such as GSM, or through Wi-Fi, such as with a wireless local area network (WLAN). Accordingly, the media device 118-2 may be capable of transmitting and receiving information wirelessly through both short range, radio frequency (RF), cellular, and Wi-Fi connections. The media device 118-2 may access the network 120 through a wireless link to an access point. For example, a media device 118-2 may access the network 120 through one or more access points 606. The access points 606 may be of any suitable type or types. For example, an access point 606 may be a cellular base station, an access point for wireless local area network (e.g., a Wi-Fi access point), an access point for wireless personal area network (e.g., a Bluetooth access point), etc. The access point 606 may connect the media device 118-2 to the network 120, which may include the Internet, an intranet, a local area network, private communication networks, etc. In some embodiments, the communications interfaces 644 may allow media device 118-2 to receive programming content cast from the television receiver. For example, the programming content from the television receiver may be indirectly transmitted via a local network (e.g., via Wi-Fi) or directly transmitted to the computing device via a casting device integrated with the television receiver or coupled to the television receiver (e.g., via a dongle). As another example, the television receiver may cast programming content to the computing device via a wired connection (e.g., via one or more of HDMI, USB, lightning connector, etc.). Some embodiments may provide for simulcasting such that the same programming that is being displayed on the display device is being displayed on the media device 118-2 simultaneously or substantially simultaneously.

The adaptive routing engine 110-3 may be provided in conjunction with the adaptive routing module 110-4, the token matching module 110-5, and/or the token store 110-6, to implement at least some of the functionalities of the transceiving subsystem 185, such as the functionalities of the adaptive router 110, into the media device 118-1. The media device 118-1 configured with the adaptive routing engine 110-3 and/or the adaptive routing module 110-4 may perform the adaptive routing features disclosed herein. In some embodiments, the mobile application 651 may transform the media device 118-2 to configure the device 118-2 to provide one or a combination of the adaptive routing engine 110-3, with the adaptive routing module 110-4, the token matching module 110-5, and/or the token store 110-6 to implement various functionalities disclosed herein.

The one or more processors 626 may handle communications transceived via communications interfaces 644, including communications related to the configuration session 300, the transfer process 400, and other aspects related to the ACP protocol. The one or more processors 626 may handle incoming data from the communications interfaces 644. Tokens, keys, strings, codes, identifiers and/or the like data structures created in accordance with the embodiments disclosed herein (e.g., in conjunction with configuration session 300) may also be stored in the computer-readable medium 646 (e.g., in token store 110-6). Again, the adaptive routing engine 110-3 may include a token matching engine that, in conjunction with a token matching module 110-5, may be configured to facilitate the storing, augmenting, matching, and other features disclosed herein.

In various embodiments, the application 651 can be any suitable computer program that can be installed and run on the media device 118-2, and, in some embodiments, the application 651 may not be a mobile app but may be another type of application, set of applications, and/or other executable code configured to facilitate embodiments disclosed herein. The application 651 may be provided in any suitable way. For non-limiting example, the application 651 may be made available from a website, an application store, the service provider 102, etc. for download to the media device 118-2; alternatively, it may be pre-installed on the media device 118-2.

Again, the example of media device 118-2 is non-limiting. Other devices, such as those disclosed herein, may be used. It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 7:
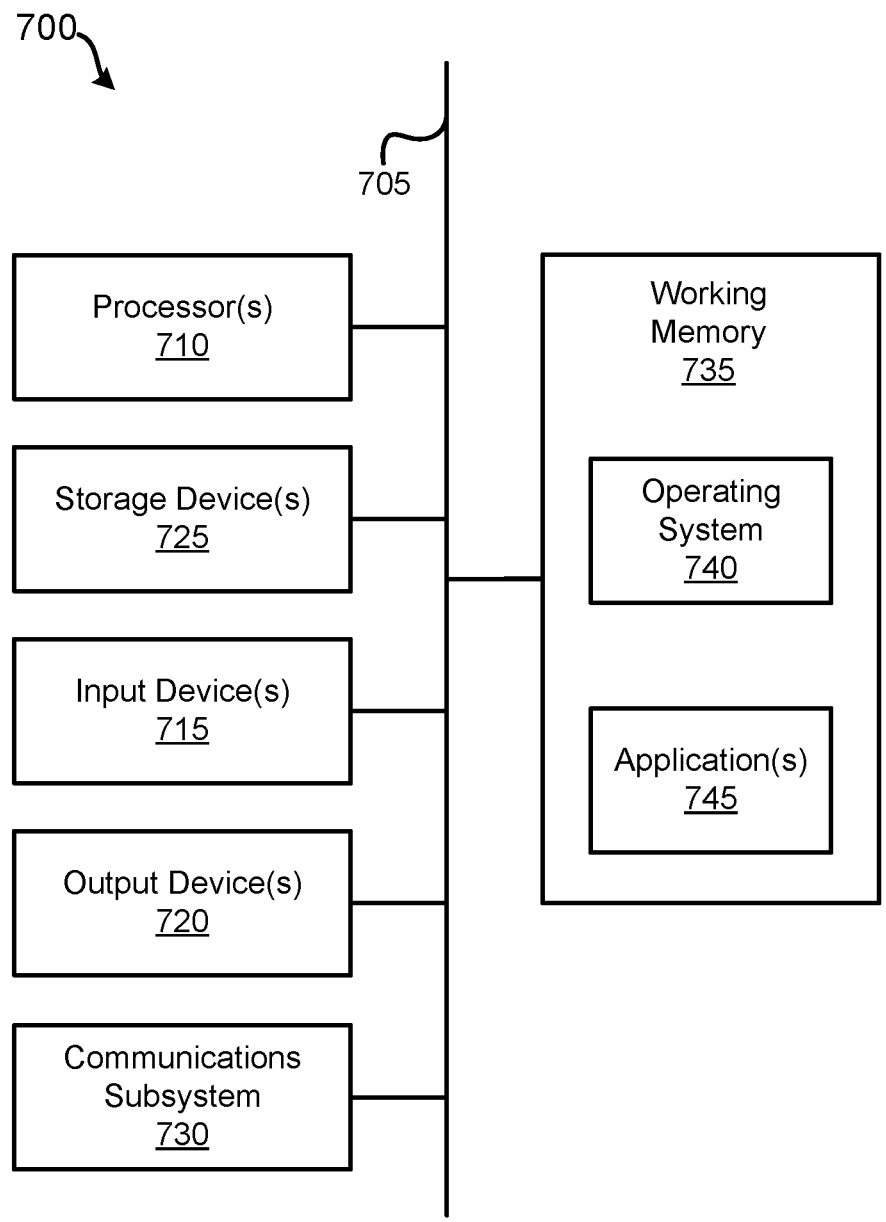
FIG. 7 illustrates a computer system, in accordance with disclosed embodiments of the present disclosure.

A computer system as illustrated in FIG. 7 may be incorporated as part of the previously described computerized devices, such as a devices, 185, 110, 116, and 118. A computer system as illustrated in FIG. 7 may be incorporated as part of the previously described computerized devices, such as a television receiver 110, device(s) 116, and/or television service provider system 102. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method for asynchronous wireless media transfer, the method comprising:
   receiving, by a media device, an electronic communication from a user interface, the electronic communication corresponding to a request for video service from a content provider system that is communicably couplable with the media device via a wireless network;
   consequent to the electronic communication, configuring the media device, by the media device, to provide an asynchronous session within which video content is subsequently transferred from the content provider system to the media device via the wireless network, where:
      the configuring the media device comprises utilizing a network layer and a transport layer of the media device to execute operations of a configuration session;
      the operations of the configuration session are executed without utilizing a presentation layer and an application layer of the media device;
      the configuration session comprises:
         creating specifications of asynchronous session parameters to define delivery operations for subsequent delivery of the video content with the asynchronous session; and
         storing an encrypted token in storage of the media device, the encrypted token corresponding to the specifications of the asynchronous session parameters;
   subsequent to the configuring the media device, requesting, by the media device, opening of the asynchronous session at least in part by transmitting the encrypted token to the content provider system via the wireless network from the transport layer of the media device;
   at a session layer of the media device, starting the asynchronous session within which video packets corresponding to the video content are delivered from the content provider system to the media device in accordance with the specifications of the asynchronous session parameters; and
   causing, by the media device, display of at least part of the video content.

2. The method for asynchronous wireless media transfer as recited in claim 1, where a session within the session layer of the media device is not opened until the starting of the asynchronous session.

3. The method for asynchronous wireless media transfer as recited in claim 2, where:

the configuring the media device to provide the asynchronous session also configures the media device for a plurality of asynchronous sessions within which the video content and/or additional video content are subsequently transferred from the content provider system to the media device via the wireless network in accordance with the specifications of the asynchronous session parameters; and each session of the plurality of the asynchronous sessions is based at least in part on a respective subsequent transmission of the encrypted token to the content provider system via the wireless network from the transport layer of the media device.

4. The method for asynchronous wireless media transfer as recited in claim 3, where the configuration session further comprises defining one or more relationship specifications to govern the video service, and the specifications of the asynchronous session parameters comprise the one or more relationship specifications.

5. The method for asynchronous wireless media transfer as recited in claim 4, where the configuration session further comprises specifying an encryption protocol for encryption of communications for subsequent transfer of the video content from the content provider system, and the specifications of the asynchronous session parameters comprise specifications of the encryption protocol.

6. The method for asynchronous wireless media transfer as recited in claim 5, where the configuration session further comprises specifying keep-alive parameters corresponding to rules for delivery of the video content, and the specifications of the asynchronous session parameters comprise the keep-alive parameters.

7. The method for asynchronous wireless media transfer as recited in claim 5, where the encrypted token is created by the content provider system and received by the media device.

8. The method for asynchronous wireless media transfer as recited in claim 5, where the encrypted token is created by the media device.

9. A media device to facilitate asynchronous wireless media transfer, the media device comprising:
one or more processors; and
memory communicatively coupled with and readable by the one or more processors and having stored therein processor-readable instructions which, when executed by the one or more processors, cause the one or more processors to perform:
processing an electronic communication received from a user interface, the electronic communication corresponding to a request for video service from a content provider system that is communicably couplable with the media device via a wireless network;
consequent to the electronic communication, configuring the media device to provide an asynchronous session within which video content is subsequently transferred from the content provider system to the media device via the wireless network, where:
the configuring the media device comprises utilizing a network layer and a transport layer of the media device to execute operations of a configuration session;
the operations of the configuration session are executed without utilizing a presentation layer and an application layer of the media device;
the configuration session comprises:
creating specifications of asynchronous session parameters to define delivery operations for subsequent delivery of the video content with the asynchronous session; and
storing an encrypted token in storage of the media device, the encrypted token corresponding to the specifications of the asynchronous session parameters;
subsequent to the configuring the media device, requesting opening of the asynchronous session at least in part by transmitting the encrypted token to the content provider system via the wireless network from the transport layer of the media device;
at a session layer of the media device, starting the asynchronous session within which video packets corresponding to the video content are delivered from the content provider system to the media device in accordance with the specifications of the asynchronous session parameters; and
causing display of at least part of the video content.

10. The media device to facilitate asynchronous wireless media transfer as recited in claim 9, where a session within the session layer of the media device is not opened until the starting of the asynchronous session.

11. The media device to facilitate asynchronous wireless media transfer as recited in claim 10, where:
the configuring the media device to provide the asynchronous session also configures the media device for a plurality of asynchronous sessions within which the video content and/or additional video content are subsequently transferred from the content provider system to the media device via the wireless network in accordance with the specifications of the asynchronous session parameters; and
each session of the plurality of the asynchronous sessions is based at least in part on a respective subsequent transmission of the encrypted token to the content provider system via the wireless network from the transport layer of the media device.

12. The media device to facilitate asynchronous wireless media transfer as recited in claim 11, where the configuration session further comprises defining one or more relationship specifications to govern the video service, and the specifications of the asynchronous session parameters comprise the one or more relationship specifications.

13. The media device to facilitate asynchronous wireless media transfer as recited in claim 12, where the configuration session further comprises specifying an encryption protocol for encryption of communications for subsequent transfer of the video content from the content provider system, and the specifications of the asynchronous session parameters comprise specifications of the encryption protocol.

14. The media device to facilitate asynchronous wireless media transfer as recited in claim 13, where the configuration session further comprises specifying keep-alive parameters corresponding to rules for delivery of the video content, and the specifications of the asynchronous session parameters comprise the keep-alive parameters.

15. The media device to facilitate asynchronous wireless media transfer as recited in claim 13, where the encrypted token is created by the content provider system and received by the media device.

16. The media device to facilitate asynchronous wireless media transfer as recited in claim 13, where the encrypted token is created by the media device.

17. One or more non-transitory, machine-readable media having machine-readable instructions thereon which, when executed by one or more processing devices, cause the one or more processing devices to perform:

> processing an electronic communication received from a user interface, the electronic communication corresponding to a request for video service from a content provider system that is communicably couplable with a media device via a wireless network;
>
> consequent to the electronic communication, configuring the media device to provide an asynchronous session within which video content is subsequently transferred from the content provider system to the media device via the wireless network, where:
>
>> the configuring the media device comprises utilizing a network layer and a transport layer of the media device to execute operations of a configuration session;
>>
>> the operations of the configuration session are executed without utilizing a presentation layer and an application layer of the media device;
>>
>> the configuration session comprises:
>>
>>> creating specifications of asynchronous session parameters to define delivery operations for subsequent delivery of the video content with the asynchronous session; and
>>>
>>> storing an encrypted token in storage of the media device, the encrypted token corresponding to the specifications of the asynchronous session parameters;
>
> subsequent to the configuring the media device, requesting opening of the asynchronous session at least in part by transmitting the encrypted token to the content provider system via the wireless network from the transport layer of the media device;
>
> at a session layer of the media device, starting the asynchronous session within which video packets corresponding to the video content are delivered from the content provider system to the media device in accordance with the specifications of the asynchronous session parameters; and
>
> causing display of at least part of the video content.

18. The one or more non-transitory, machine-readable media as recited in claim 17, where a session within the session layer of the media device is not opened until the starting of the asynchronous session.

19. The one or more non-transitory, machine-readable media as recited in claim 18, where:

> the configuring the media device to provide the asynchronous session also configures the media device for a plurality of asynchronous sessions within which the video content and/or additional video content are subsequently transferred from the content provider system to the media device via the wireless network in accordance with the specifications of the asynchronous session parameters; and
>
> each session of the plurality of the asynchronous sessions is based at least in part on a respective subsequent transmission of the encrypted token to the content provider system via the wireless network from the transport layer of the media device.

20. The one or more non-transitory, machine-readable media as recited in claim 19, where the configuration session further comprises defining one or more relationship specifications to govern the video service, and the specifications of the asynchronous session parameters comprise the one or more relationship specifications.

* * * * *